(12) United States Patent
Iannacchione

(10) Patent No.: US 8,475,573 B2
(45) Date of Patent: Jul. 2, 2013

(54) SYSTEM AND METHOD FOR PROTECTION OF SCR CATALYST

(75) Inventor: Steven P. Iannacchione, Canal Fulton, OH (US)

(73) Assignee: Babcock & Wilcox Power Generation Group, Inc., Baberton, OH (US)

( * ) Notice: Subject to any disclaimer, the term of this patent is extended or adjusted under 35 U.S.C. 154(b) by 526 days.

(21) Appl. No.: 12/547,040

(22) Filed: Aug. 25, 2009

(65) Prior Publication Data

US 2011/0048234 A1    Mar. 3, 2011

(51) Int. Cl.
*B01D 46/00* (2006.01)
*B01D 39/14* (2006.01)
*B01D 39/06* (2006.01)
*B01D 24/00* (2006.01)
*B01D 50/00* (2006.01)

(52) U.S. Cl.
USPC .......... 95/273; 55/522; 55/523; 55/524; 422/169; 422/170; 422/171; 422/172; 422/177; 422/178; 422/179; 422/180; 422/181; 422/182

(58) Field of Classification Search
USPC .............. 95/273; 55/522–524; 422/169–172, 422/177–182
See application file for complete search history.

(56) References Cited

U.S. PATENT DOCUMENTS

| | | | | |
|---|---|---|---|---|
| 2,847,766 A | * | 8/1958 | Silver | 34/594 |
| 2,893,853 A | * | 7/1959 | Milbourne | 48/211 |
| 5,511,495 A | * | 4/1996 | Kinto et al. | 110/165 A |
| 5,678,403 A | * | 10/1997 | Kanehara et al. | 60/309 |
| 8,052,766 B2 | * | 11/2011 | Varner et al. | 55/300 |
| 2002/0059930 A1 | * | 5/2002 | Schmidmayer et al. | 126/19 R |
| 2005/0150439 A1 | * | 7/2005 | Ryan | 110/216 |
| 2005/0268584 A1 | * | 12/2005 | Bruggendick et al. | 55/483 |
| 2006/0210456 A1 | * | 9/2006 | Bruggendick | 422/176 |
| 2006/0210721 A1 | * | 9/2006 | Hall | 427/446 |
| 2009/0223415 A1 | * | 9/2009 | Abe et al. | 106/819 |

* cited by examiner

*Primary Examiner* — Amber Orlando
(74) *Attorney, Agent, or Firm* — Eric Marich

(57) ABSTRACT

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for preventing the plugging, blockage and/or contamination of an SCR catalyst. In another embodiment, the method and apparatus of the present invention is designed to protect an SCR catalyst from plugging and/or blockage from large particle ash that may be generated during combustion.

6 Claims, 6 Drawing Sheets

SYSTEM AND METHOD FOR PROTECTION OF SCR CATALYST

FIELD AND BACKGROUND OF THE INVENTION

1. Field of the Invention

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for preventing the plugging, blockage and/or contamination of an SCR catalyst. In another embodiment, the method and apparatus of the present invention is designed to protect an SCR catalyst from plugging and/or blockage from large particle ash that may be generated during combustion.

2. Description of the Related Art $NO_x$ refers to the cumulative emissions of nitric oxide (NO), nitrogen dioxide ($NO_2$) and trace quantities of other nitrogen oxide species generated during combustion. Combustion of any fossil fuel generates some level of $NO_x$ due to high temperatures and the availability of oxygen and nitrogen from both the air and fuel. $NO_x$ emissions may be controlled using low $NO_x$ combustion technology and post-combustion techniques. One such post-combustion technique is selective catalytic reduction using an apparatus generally referred to as a selective catalytic reactor or simply as an SCR.

SCR technology is used worldwide to control $NO_x$ emissions from combustion sources. This technology has been used widely in Japan for $NO_x$ control from utility boilers since the late 1970's, in Germany since the late 1980's, and in the US since the 1990's. The function of the SCR system is to react $NO_x$ with ammonia ($NH_3$) and oxygen to form molecular nitrogen and water. Industrial scale SCRs have been designed to operate principally in the temperature range of 500° F. to 900° F., but most often in the range of 550° F. to 750° F. SCRs are typically designed to meet a specified $NO_x$ reduction efficiency at a maximum allowable ammonia slip. Ammonia slip is the concentration, expressed in parts per million by volume, of unreacted ammonia exiting the SCR.

For additional details concerning $NO_x$ removal technologies used in the industrial and power generation industries, the reader is referred to *Steam: its generation and use*, 41$^{st}$ Edition, Kitto and Stultz, Eds., Copyright© 2005, The Babcock & Wilcox Company, Barberton, Ohio, U.S.A., particularly Chapter 34—Nitrogen Oxides Control, the text of which is hereby incorporated by reference as though fully set forth herein.

Regulations (March 2005) issued by the EPA promise to increase the portion of utility boilers equipped with SCRs. SCRs are generally designed for a maximum efficiency of about 90%. This limit is not set by any theoretical limits on the capability of SCRs to achieve higher levels of $NO_x$ destruction. Rather, it is a practical limit set to prevent excessive levels of ammonia slip. This problem is explained as follows.

In an SCR, ammonia reacts with $NO_x$ according to the following stoichiometric reactions (a) to (c):

$$4NO+4NH_3+O_2 \rightarrow 4N_2+6H_2O \quad (a)$$

$$12NO_2+12NH_3 \rightarrow 12N_2+18H_2O+3O_2 \quad (b)$$

$$2NO_2+4NH_3+O_2 \rightarrow 3N_2+6H_2O \quad (c).$$

The above reactions are catalyzed using a suitable catalyst. Suitable catalysts are discussed in, for example, U.S. Pat. Nos. 5,540,897; 5,567,394; and 5,585,081 to Chu et al., all of which are hereby incorporated by reference as though fully set forth herein. Catalyst formulations generally fall into one of three categories: base metal, zeolite and precious metal.

Base metal catalysts use titanium oxide with small amounts of vanadium, molybdenum, tungsten or a combination of several other active chemical agents. The base metal catalysts are selective and operate in the specified temperature range. The major drawback of the base metal catalyst is its potential to oxidize $SO_2$ to $SO_3$; the degree of oxidation varies based on catalyst chemical formulation. The quantities of $SO_3$ which are formed can react with the ammonia carryover to form various ammonium-sulfate salts.

Zeolite catalysts are aluminosilicate materials which function similarly to base metal catalysts. One potential advantage of zeolite catalysts is their higher operating temperature of about 970° F. (521° C.). These catalysts can also oxidize $SO_2$ to $SO_3$ and must be carefully matched to the flue gas conditions.

Precious metal catalysts are generally manufactured from platinum and rhodium. Precious metal catalysts also require careful consideration of flue gas constituents and operating temperatures. While effective in reducing $NO_R$, these catalysts can also act as oxidizing catalysts, converting CO to $CO_2$ under proper temperature conditions. However, $SO_2$ oxidation to $SO_3$ and high material costs often make precious metal catalysts less attractive.

As is known to those of skill in the art, various SCR catalysts undergo plugging and/or poisoning when they become contaminated by various compounds including, but not limited to, ash from the combustion process (in particular coal ash). One common source of plugging in SCRs is large particle ash (typically defined as any ash that has a particle size large enough to lodge in the catalyst passages, pores, or honeycomb structure present in the SCR catalyst blocks).

Given the above, a need exists for a system and method that can prevent the plugging and/or poisoning of a catalyst in an SCR with fly ash, particularly large particle ash.

SUMMARY OF THE INVENTION

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for preventing the plugging, blockage and/or contamination of an SCR catalyst. In another embodiment, the method and apparatus of the present invention is designed to protect an SCR catalyst from plugging and/or blockage from large particle ash that may be generated during combustion.

Accordingly, one aspect of the present invention is drawn to a system for increasing the active life of an SCR catalyst, the system comprising: (i) at least one first flue gas conduit designed to transport flue gas from a combustion zone to an SCR; (ii) at least one SCR positioned between the at least one first flue gas conduit and at least one second flue gas conduit, wherein the at least one second flue gas conduit is designed to transport flue gas from the SCR to additional downstream systems or environmental controls; (iii) at least one large particle ash screen positioned in the at least one first flue conduit so as to enable the collection of at least about 50 percent of any large particle ash present in the flue gas prior to the entry of the flue gas into the at least one SCR; and (iv) at least one rotary valve positioned to be in working communication with the large particle ash screen, wherein the at least one rotary valve is designed to collect any large particle ash captured by the at least one large particle ash screen and supply such large particle ash to the at least one second flue gas conduit.

Another aspect of the present invention is drawn to a system for increasing the active life of an SCR catalyst, the system comprising: (A) at least one first flue gas conduit designed to transport flue gas from a combustion zone to an SCR, the at least one first flue gas conduit being designed to permit the flue gas to flow at a first flow velocity; (B) at least one second flue gas conduit that is in operative communication with the at least one first flue gas conduit, wherein the at least one second flue gas conduit is designed to transport flue gas from the at least one first flue gas conduit to an SCR, the at least one second flue gas conduit being designed to permit the flue gas to flow at a second flow velocity, and the second flow velocity is at least 10 percent less than the first flow velocity; (C) at least one third flue gas conduit designed to transport flue gas from the SCR to additional downstream systems or environmental controls; and (D) at least one rotary valve positioned to be in working communication with the at least one second flue gas conduit, wherein the at least one rotary valve is designed to collect any large particle ash captured in the at least one second flue gas conduit and supply such large particle ash to the at least one third flue gas conduit, wherein the combination of the at least one second flue gas conduit and the at least one rotary valve enable the collection of at least about 50 percent of any large particle ash present in the flue gas prior to the entry of the flue gas into the at least one SCR.

In yet another aspect of the present invention, there is provided a method for increasing the active life of an SCR catalyst, the method comprising the steps of: (a) providing at least one large particle ash collection means designed to collect large particle ash in a flue gas stream upstream of the entry of the flue gas into an SCR; and (b) collecting the large particle ash in the at least one large particle ash collection means so as to remove at least about 50 percent of the large particle ash from the flue gas stream prior to entry of the flue gas stream into the SCR; and (c) supplying the collected large particle ash to a point in the flue gas stream downstream of the SCR.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

Figure 1:
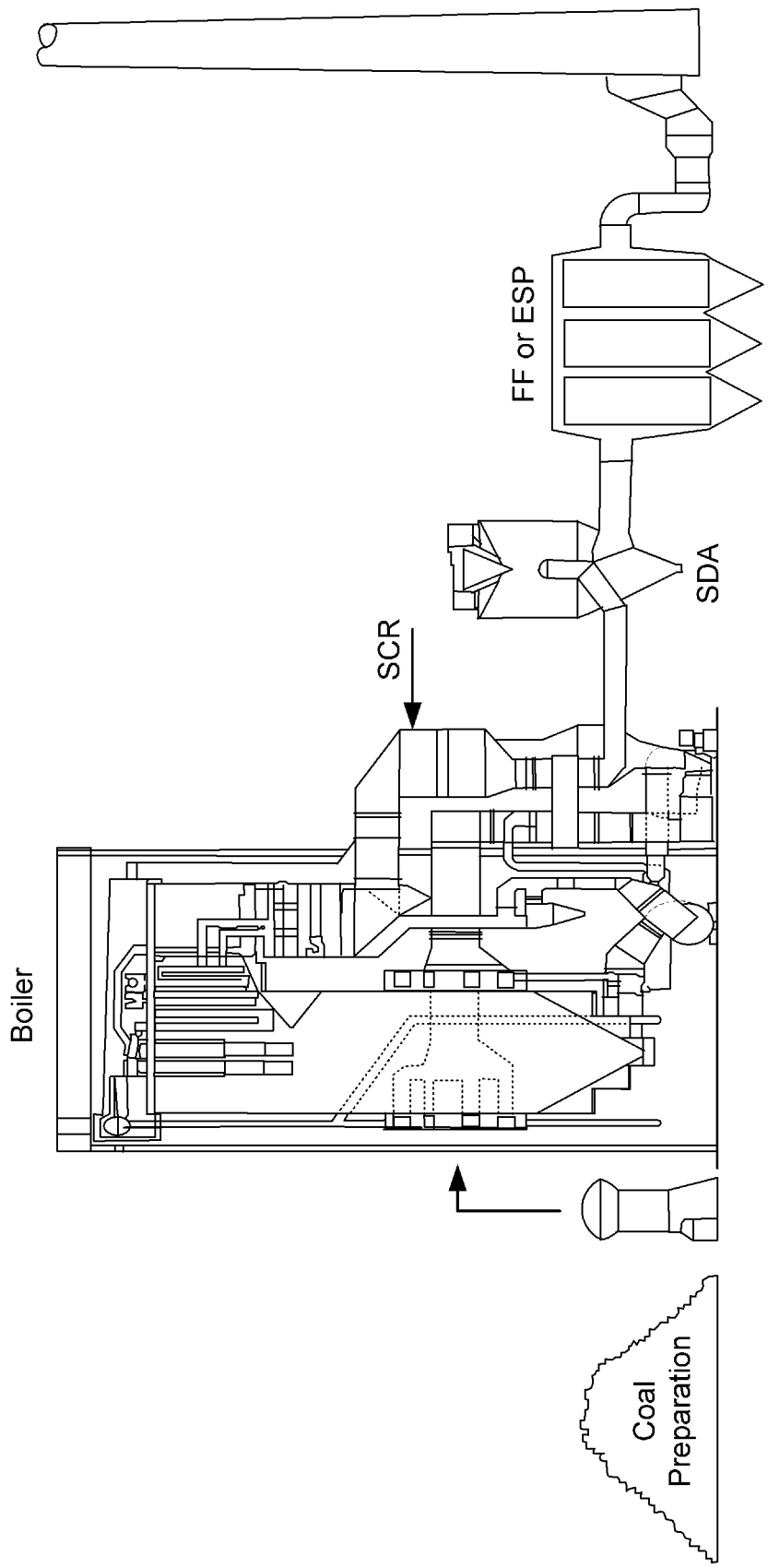
FIG. 1 is a schematic representation of a typical prior art fossil fuel burning facility, designed and initially provided with an SCR system.

While the present invention will be described in terms of SCR systems which use ammonia as the NO reducing agent, since ammonia is frequently preferred for economic reasons, the present invention is not limited to ammonia based systems. The concepts of the present invention can be used in any system which uses an ammoniacal compound. As used in the present disclosure, an ammoniacal compound is a term meant to include compounds such as urea, ammonium sulfate, cyanuric acid, and organic amines as well as ammonia ($NH_3$). These compounds could be used as reducing agents in addition to ammonia, but as mentioned above, ammonia is frequently preferred for economic reasons. Some non-ammoniacal compounds such as carbon monoxide or methane can be used as well, but with loss in effectiveness.

Although the present invention is described in relation to a boiler, or a fossil fuel boiler, it is not limited solely thereto. Instead, the present invention can be applied to any combustion source that generates NO regardless of whether such a combustion source is utilized in conjunction with a boiler, or a steam generator. For example, the present invention could be used in combination with a kiln, a heater, or any other type of combustion process that generates, in whole or in part, a flue gas or combustion gas containing $NO_x$. Accordingly, the description below is to be construed as merely exemplary. Additionally, the present invention can be applied to any SCR regardless of the type of catalyst that is utilized therein. As such, the present invention is not limited to any one type of SCR catalyst, but rather is broadly applicable to a wide range of SCR catalyst systems. Suitable catalyst systems for which the present invention is applicable include, but are not limited to, honeycomb, corrugated and plate-type catalysts.

In one embodiment, the present invention is directed to reducing the rate of SCR catalyst deactivation on Powder River Basin (PRB) coal combustion units. It should be noted that although the present invention is described in relation to PRB coal, the present invention is not limited thereto. Rather, the present invention is broadly applicable to any situation where an SCR catalyst is plugged, blocked and/or contaminated by large particle ash (LPA) that accumulates in the catalyst passages, pores, or honeycomb structure present in the SCR catalyst blocks.

In one embodiment, PRB coal is suspected to cause plugging, blockage and/or contamination of the catalyst passages, pores, or honeycomb structure present in the SCR catalyst blocks due to the presence of LPA which can be characterized, in a non-limiting manner, as popcorn ash. While not wishing to be bound to any one definition, LPA is defined as ash having a mean particle size of at least about 4 mm, or even at least about 6 mm. In one embodiment, LPA has any type of geometry including, but not limited to, irregular geometries, spherical geometries, oblong geometries, ellipsoidal geometries, or any combination of two or more thereof. In another embodiment, LPA is defined as any ash that is larger than the catalyst passages, pores, or honeycomb structure present in the SCR catalyst blocks. In this embodiment, the size of the LPA only has to be sufficient to cause plugging, blockage and/or contamination of the catalyst in the SCR.

In one embodiment, the present invention relates to a system and method to prevent plugging, blockage and/or contamination of the catalyst passages, pores, or honeycomb structure present in the SCR catalyst blocks due to the presence of LPA. In one embodiment, the present invention accomplishes the aforementioned goal by the addition of at least one LPA screen and at least one rotary valve located at a position in the flue conduit downstream of the boiler but upstream of the SCR designed to remove at least about 50 percent of the LPA present in the flue gas stream. In another embodiment, the present invention is designed to remove at least about 75 percent, at least about 85 percent, at least about 95 percent, or even at least about 99 percent of the LPA present in the flue gas stream. Here, as well as elsewhere in the specification and claims, individual range limits can be combined to form new and/or non-disclosed ranges.

Figure 2:
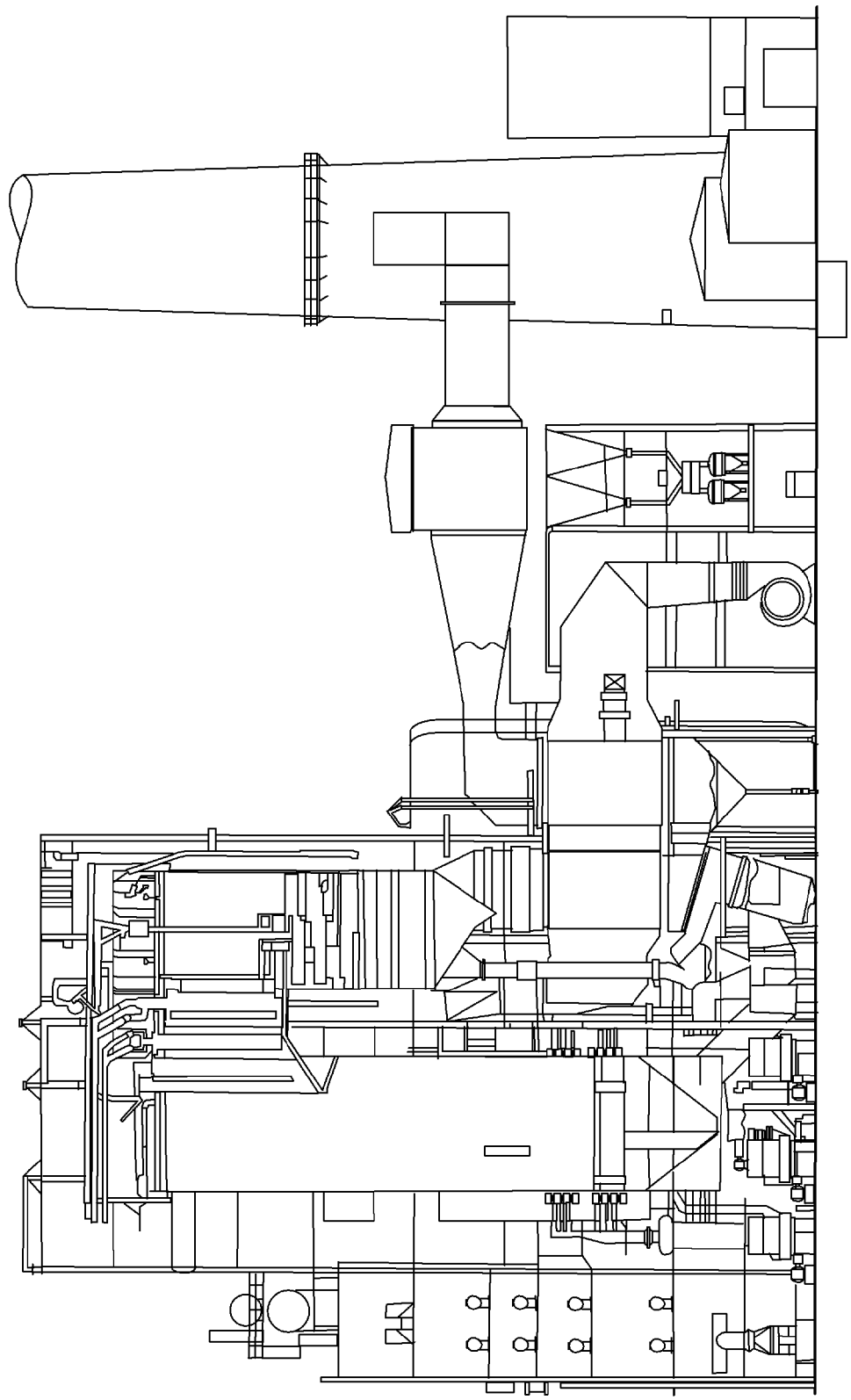
FIG. 2 is a schematic representation of another typical prior art fossil fuel burning facility which was not designed or initially provided with an SCR system.

Turning to the Figures, FIG. 1 is an illustration of a typical power plant that utilizes coal as a combustion source, and which was designed and initially provided with an SCR system. As can be seen in FIG. 1, a typical power plant includes a SCR located between a boiler portion of the power plant and a spray dry absorber (SDA). The SDA is used to remove sulfur oxides from the flue gas produced during the combustion process in the boiler portion. In another prior art configuration, illustrated in FIG. 2, which was not designed or initially provided with an SCR system, the flue gases from the boiler are conveyed through at least one flue to an air heater (in FIG. 2, a tubular air heater) and then to downstream particle collection devices such as an electrostatic precipitator or ESP as shown, without any type of system to remove any LPA present in the flue gas from the flue gas stream. As a consequence of this, if an SCR were to be added, the LPA produced during the combustion process in the boiler could cause plugging, blockage and/or contamination of the catalyst passages, pores, or honeycomb structure present in the SCR catalyst blocks due to the presence of LPA.

Figure 3:
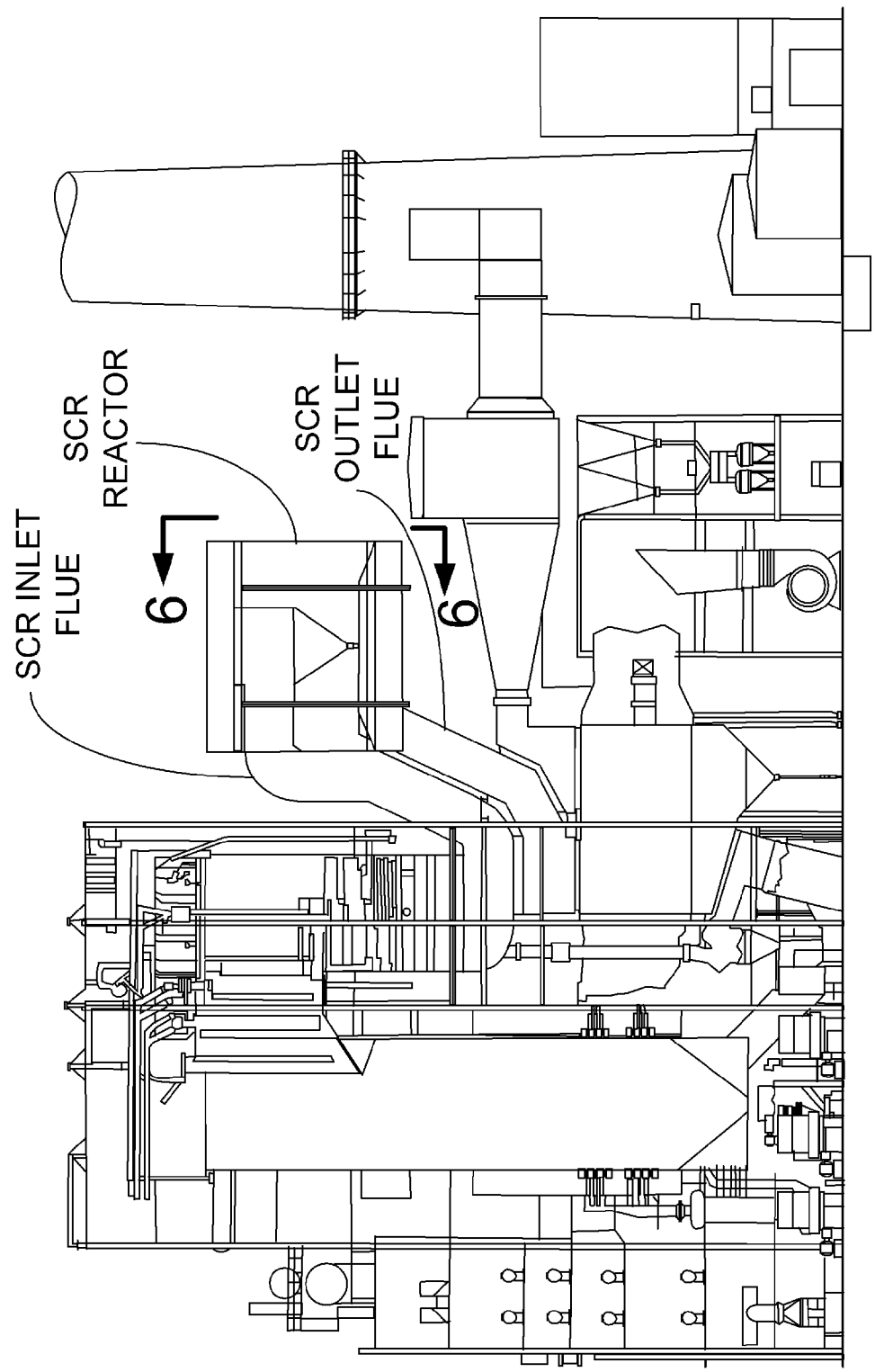
FIG. 3 is a schematic representation of the fossil fuel burning facility of FIG. 2, to which an SCR system and the present invention have been added.
Figure 4:
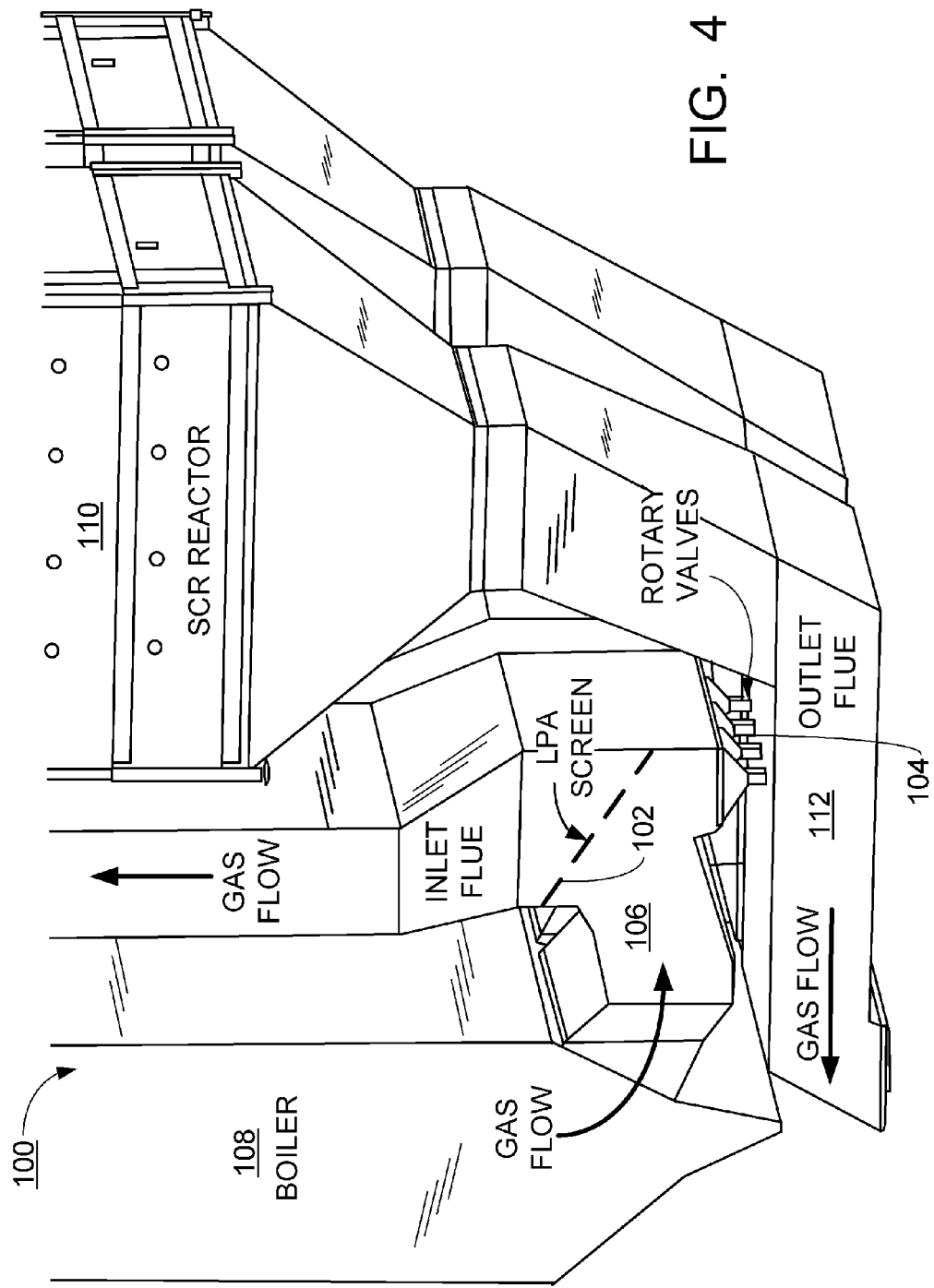
FIG. 4 is a close-up, perspective view illustrating the arrangement of the flues from the boiler and the lower outlet portion of the SCR of FIG. 3, in accordance with one embodiment of the present invention.
Figure 5:
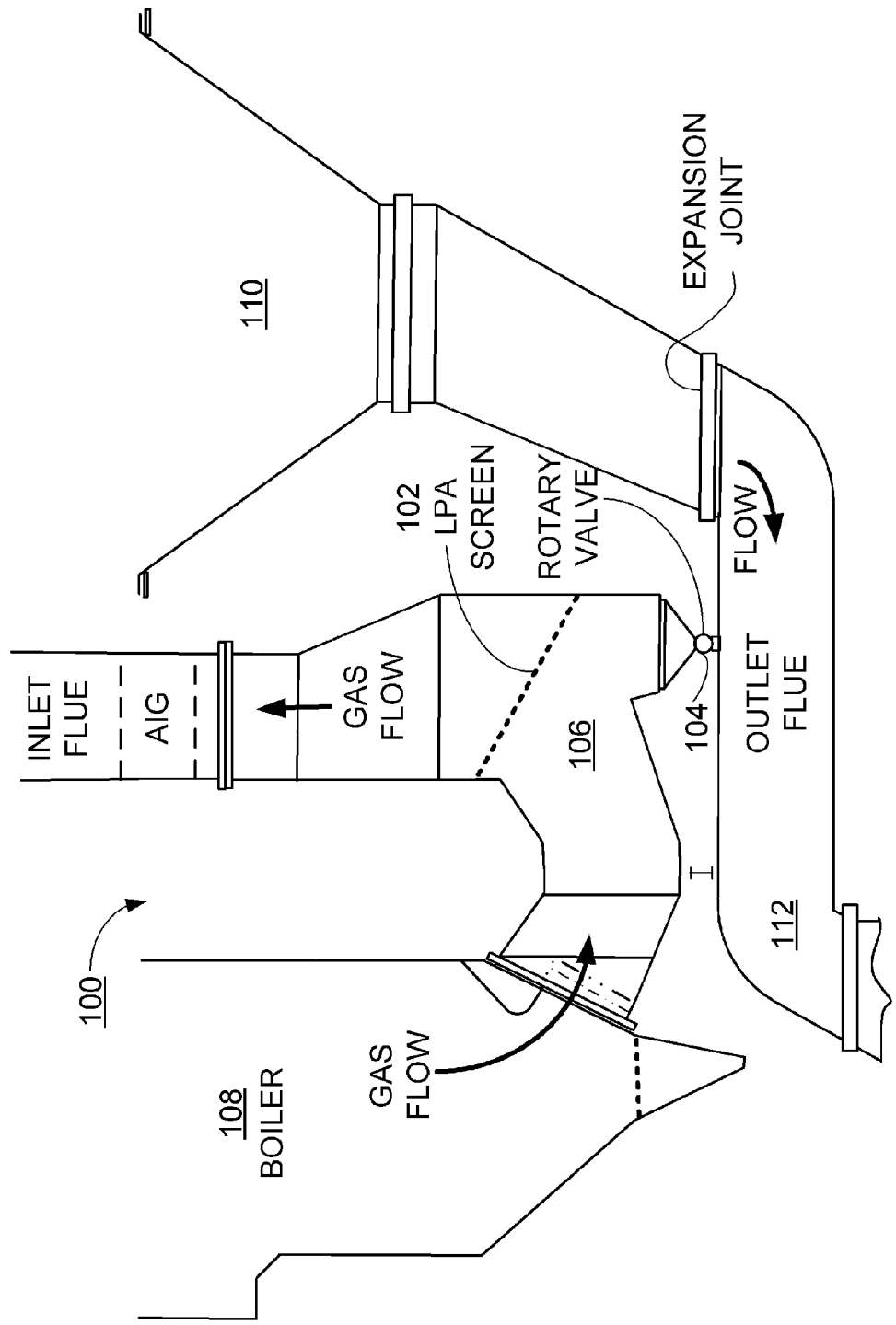
FIG. 5 is a side view of the arrangement of the flues from the boiler and the lower outlet portion of the SCR of FIG. 4, in accordance with one embodiment of the present invention.

As is noted above, the present invention addresses this problem through the use of least one LPA screen and/or at least one rotary valve located at a position in the flue conduit downstream of the boiler but upstream of the SCR and designed to remove at least about 50 percent of the LPA present in the flue gas stream. In one embodiment, as is illustrated in FIGS. 3, 4 and 5, the system 100 of the present invention comprises at least one LPA screen 102 and at least one rotary valve 104 that are positioned along a flue conduit 106 downstream of the boiler 108 but upstream of the SCR reactor or SCR 110 so as to remove at least about 50 percent of the LPA present in the flue gas stream. In one particular embodiment, the SCR unit 110 and an SCR outlet flue 112 therefrom are positioned in such a manner that the LPA collected from the flue gas prior to entry of the flue gas into the SCR 110 can be diverted and supplied to the SCR outlet flue 112. As can be seen from FIGS. 3, 4 and 5, LPA screen 102 is provided at any suitable incline so as to cause LPA impacting LPA screen 102 to fall toward the at least one rotary valve 104. Additionally, LPA screen 102 is formed across the entire cross-section of flue conduit 106 so that any LPA present in the flue gas stream contained in conduit 106 must attempt to "pass through" LPA screen 102.

As can be seen in FIGS. 3, 4, 5 and 6, there can be multiple conduits 106 that transport flue gas from boiler 108 to SCR 110. In this case, each conduit 106 has a LPA screen 102 and at least one rotary valve 104 as described above. As can be seen in FIG. 4, each rotary valve is connected to a hopper designed to funnel LPA to a respective rotary valve. In either of these embodiments, the SCR outlet flue, or flues, 112 is/are designed to transport the SCR-treated flue gas and "added" LPA to additional downstream systems and/or environmental controls (e.g., an air heater, an SDA, or a baghouse, precipitator or other particle control device).

Figure 6:
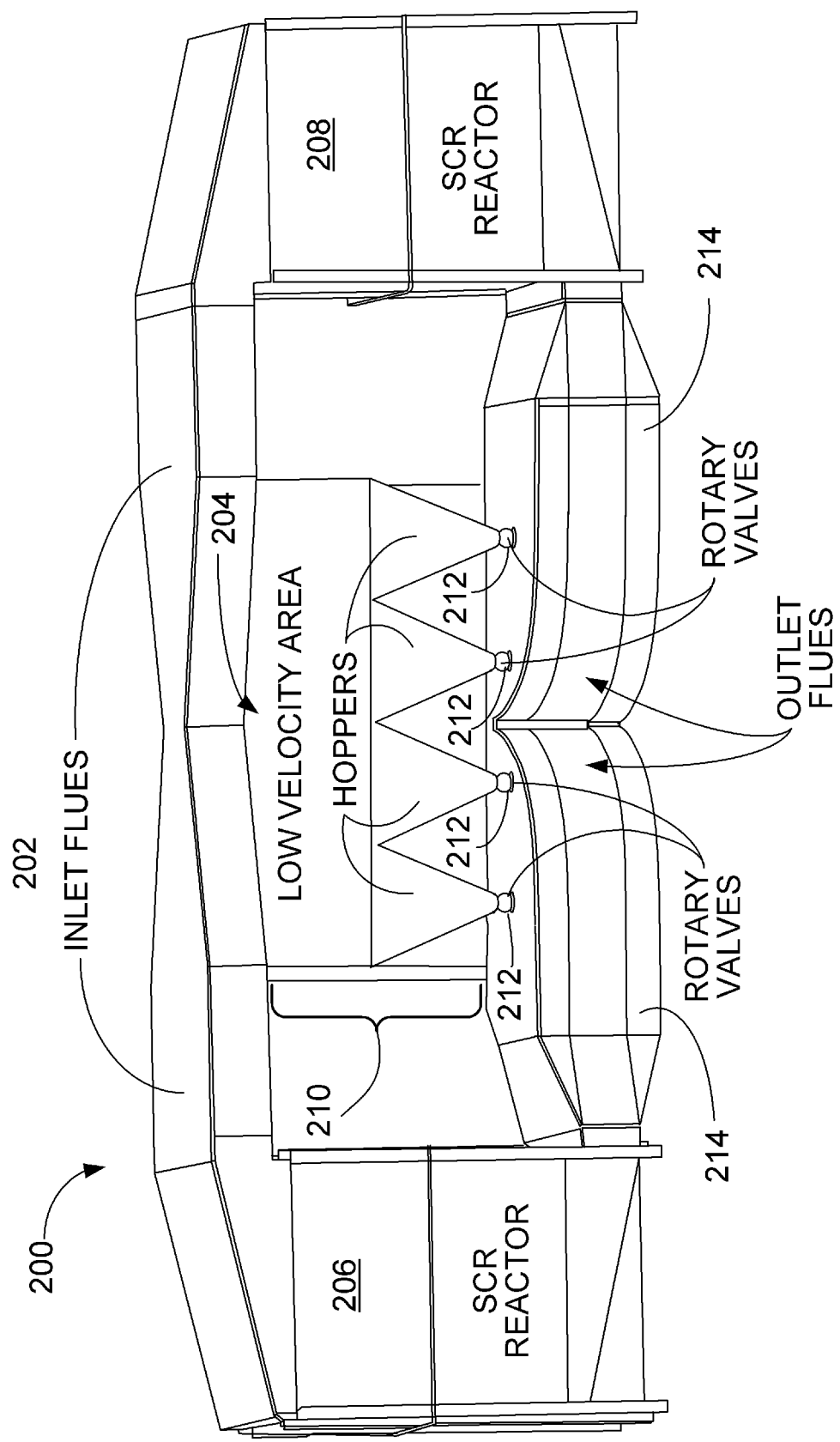
FIG. 6 is a cross-sectional view of the arrangement of the flues from the boiler and the lower outlet portion of the SCR of FIG. 4, viewed in the direction of arrows 6-6 of FIG. 3.

In another embodiment, the at least one LPA screen 102 can be eliminated from the system of the present invention in the instance where the flue conduits that transport the flue gas from the boiler to the SCR are designed in such a manner as to contain a reduced velocity zone. The reduced velocity zone is an area in the flue conduit where the flue conduit size is altered in such a manner as to result in a sufficient reduction in the velocity of the flue gas thereby causing the LPA present in the flue gas to "fall out" and collect in the hopper so that it can be conveyed therefrom via the one or more appropriately positioned rotary valves. This embodiment is illustrated in FIG. 6 where system 200 according to the embodiment comprises an inlet flue conduit 202 that supplies flue gas to a low velocity area 204 having a cross-section and/or volume that is sufficiently larger than conduit 202 so as to cause a suitable reduction in flue gas velocity, thereby resulting in the "fall out" of a suitable amount of LPA. In the embodiment of FIG. 6, the SCR is split into two sections, sections 206 and 208, placed on either side of an LPA collection area 210 located therebetween. As can be seen in FIG. 6, low velocity area 204 (which is also an LPA collection area) contains at least one rotary valve 212 connected thereto. As can be seen in FIG. 6, each rotary valve 212 is positioned at a hopper designed to funnel LPA to a respective rotary valve 212. As with the other embodiments of the present invention the one or more rotary valves 212 are designed to convey collected LPA and "add" the LPA back into the flue gas after the flue gas is treated in the SCR and exits the one or more SCR sections via flue conduit 214. The flue gas is then permitted to travel on to additional downstream systems and/or environmental controls (e.g., an air heater, an SDA, or a fabric filter, precipitator or other particle control device).

A non-limiting example of a reduced velocity embodiment would involve a flue gas stream that has a speed of about 50 feet per second after exiting the boiler, where such a flue gas stream is then slowed down by way of supplying the flue gas to a flue conduit having a larger cross-sectional area. This in turn causes at least about 50 percent of the LPA present in the flue gas stream to "drop out" due to the reduced flow speed that occurs when the flue gas travels from a high flow velocity area to a lower flow velocity area. In this embodiment the area in the flue conduit with the larger cross-sectional area further comprises one or more rotary valves designed to collect and supply the LPA to a conduit downstream of the SDA so that the LPA can be collected at a suitable point after bypassing the SDA. In another embodiment, this embodiment of the present invention is designed to remove at least about 75 percent, at least about 85 percent, at least about 95 percent, or even at least about 99 percent of the LPA present in the flue gas stream. Here, as well as elsewhere in the specification and claims, individual range limits can be combined to form new and/or non-disclosed ranges.

In another embodiment, the "velocity drop" achieved from the high velocity flue conduit to the low velocity flue conduit is at least about a 10 percent reduction in flue gas velocity. In still another embodiment, the "velocity drop" achieved from the high velocity flue conduit to the low velocity flue conduit is at least about a 20 percent, at least about a 30 percent, at least about a 40 percent, or even at least about a 50 percent reduction in flue gas velocity. Here, as well as elsewhere in the specification and claims, individual range limits can be combined to form new and/or non-disclosed ranges. If desired, this embodiment of the present invention can further include a LPA screen. Regarding the LPA screen of either embodiment of the present invention, such a screen can be made from any suitable material that can withstand exposure to the conditions typically found in the flue gas stream as it exits the boiler. Suitable materials from which a LPA screen, or screens, can be formed from include, but are not limited to, one or more metals, one or more metal alloys, one or more ceramic compositions, or any suitable combination of two or more thereof. In one embodiment, the LPA screen of the present invention is formed from a mesh. In another embodiment, the LPA screen can be a plate structure in which suitably sized openings are formed therein. In either embodiment, the opening in the LPA screen should be sized in such a manner so as to prevent the passage there through. In one embodiment, the openings in an LPA screen, or LPA plate, of the present invention have a cross-sectional area of no more than about 38.5 mm2, no more than about 28.3 mm2, no more than about 19.6 mm2, or even no more than about 12.6 mm2. In still another embodiment, any LPA screen of the present invention can be replaced by multiple LPA screens that are arranged in downstream from one another. In this embodiment, each successive LPA screen would contain smaller openings there through so as to progressively and selectively remove LPA from a flue gas stream prior to entry of the flue gas stream to an SCR.

The flue gas static pressure upstream of the SCR (and thus at the inlets of the rotary valves on the hoppers on the inlet flues) will be higher than the flue gas static pressure on the downstream side of the SCR at the discharge (and thus at the outlets of the rotary valves connected to the outlet flues), due to the pressure drop through the SCR catalyst modules and associated flues. Rotary valves are thus used in the present invention because they are able to transport material between regions at different pressures. The rotary valves utilized in conjunction with the present invention are known in the art and, as such, an exhaustive discussion of same and their principles of operation herein are omitted for the sake of brevity. A suitable example of a rotary valve that can be used in conjunction with the present invention is a bottom discharge type rotary valve, available from Ricon Engineers, 6-A, Archana Industrial Estate, Opp. Ajit Mill, Rakhial, Ahmedabad—380023, Gujarat (INDIA).

The present invention is advantageous in that it is applicable to installations with existing SCRs (retrofits) and new SCRs. Additionally, the present invention can be applied to plants that utilize biomass as a fuel source. In one embodiment, implementation of the present invention can be accomplished in a cost-effective manner utilizing low cost hardware designed to remove any large particle ash (LPA) that is present in a flue gas stream prior to SCR treatment. The present invention also does not affect the current design of boilers and SCRs.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A system for increasing the active life of an SCR catalyst, the system comprising:
    (i) at least one first flue gas conduit designed to transport flue gas from a combustion zone to an SCR catalyst;
    (ii) at least one SCR catalyst positioned between the at least one first flue gas conduit and at least one second flue gas conduit, wherein the at least one second flue gas conduit is designed to transport flue gas from the SCR catalyst to additional downstream systems or environmental controls, each of the at least one SCR catalyst being split into two SCR catalyst sections;
    (iii) a large particle ash collection area located in between each of the two SCR catalyst sections so as to enable the collection of at least about 50 percent of any large particle ash present in the flue gas prior to the entry of the flue gas into the at least one SCR catalyst;
    (iv) at least one rotary valve positioned to be in working communication with the large particle ash collection area, the at least one rotary valve being adapted to collect any large particle ash captured by the at least one large particle ash collection area and supply such large particle ash to the at least one second flue gas conduit; and
    (v) at least one hopper, each at least one hopper positioned to be in working communication with each at least one rotary valve, the at least one hopper being adapted to funnel large particle ash to one of the at least one rotary valve.

2. The system of claim 1, wherein the large particle ash collection area is located in between each of the two SCR catalyst sections so as to enable the collection of at least about 75 percent of any large particle ash present in the flue gas prior to the entry of the flue gas into the at least one SCR catalyst.

3. The system of claim 1, wherein the large particle ash collection area is located in between each of the two SCR catalyst sections so as to enable the collection of at least about 95 percent of any large particle ash present in the flue gas prior to the entry of the flue gas into the at least one SCR catalyst.

4. The system of claim 1, wherein the large particle ash has a mean particle size of at least about 4 mm to about 6 mm.

5. The system of claim 1, wherein the large particle ash collection area comprises at least one large particle ash screen.

6. The system according to claim 1, wherein the at least one first flue gas conduit is designed to contain a reduced velocity zone which will cause the large particle ash present in the flue gas to fall out and collect in the at least one hopper.

* * * * *